No. 709,408. Patented Sept. 16, 1902.
E. H. JAHNZ.
DEVICE FOR CUTTING OFF PIECES OF BELTS, &c.
(Application filed Aug. 5, 1901.)
(No Model.)
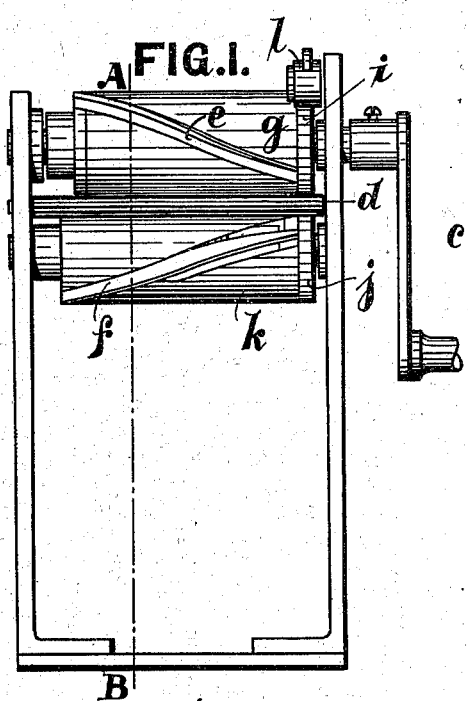
FIG. 1.
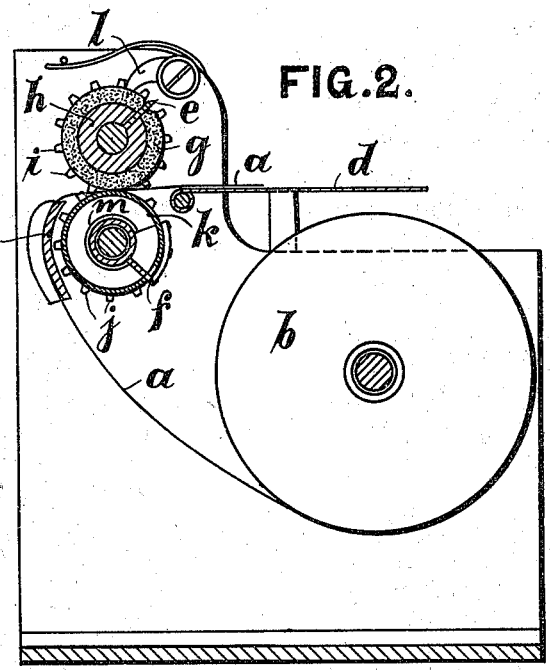
FIG. 2.
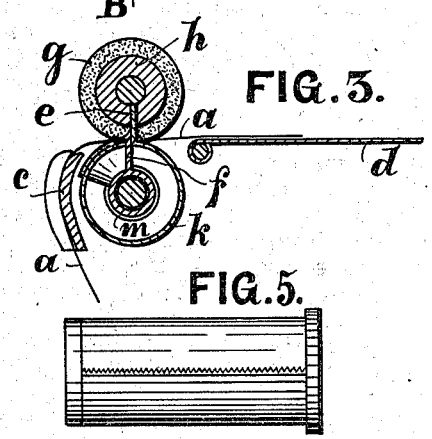
FIG. 3.
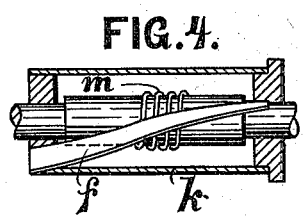
FIG. 4.
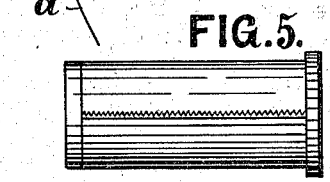
FIG. 5.
FIG. 6.
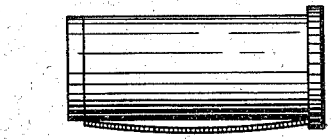
FIG. 7.
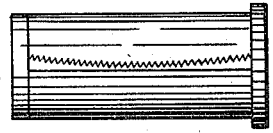
FIG. 8.
WITNESSES:
Otto Munk
Adelaide C. Gleason
INVENTOR.
Erwin Hermann Jahnz
BY
Richards
ATTORNEYS

UNITED STATES PATENT OFFICE.

ERWIN HERMANN JAHNZ, OF WESTEND, GERMANY, ASSIGNOR TO DR. PAUL MEYER ACTIENGESELLSCHAFT, OF BERLIN, GERMANY.

DEVICE FOR CUTTING OFF PIECES OF BELTS, &c.

SPECIFICATION forming part of Letters Patent No. 709,408, dated September 16, 1902.

Application filed August 5, 1901. Serial No. 70,952. (No model.)

*To all whom it may concern:*

Be it known that I, ERWIN HERMANN JAHNZ, engineer, a subject of the King of Prussia, German Emperor, residing at Westend, near Berlin, Germany, have invented certain new and useful Improvements in Devices for Cutting Off Pieces of Belts or Strips of Paper, Weaving, or the Like, of which the following is a specification.

The new device consists, essentially, of rotary cutters working together in pairs, the axes of rotation of which are vertical to the direction of the feed and parallel to the plane of the belt. The cutters are combined with the feed-rollers or fixed thereon; but they do not move radially or in the direction of the axes of the rotation. It is well known that it is preferable not to make the cut right through at once, but to gradually sever the smaller piece. This is attained in the new apparatus by the employment of cutters of a special form. Their cutting edges either describe cylindrical courses around the axis of rotation, but at the same time spirally, or else they are arranged so as not to be at an equal distance from the axis of rotation at all points, whereby one part is caused to cut later than the other.

In the accompanying drawings are illustrated several constructional forms of the new cutting device.

Figure 1 shows a device with spiral cutters. Fig. 2 is a section on line A B in Fig. 1. Fig. 3 is a longitudinal section through one of the rollers. Fig. 4 illustrates the working of the cutters. Figs. 5 and 6 show in view another form of the rollers with coöperating cutters. Figs. 7 and 8 are the respective plan views of the same.

The belt or strip $a$, Figs. 1 to 3, is wound up a magazine-roller $b$ and is conveyed by the conducting-piece $c$ between the cutters. The pieces cut off lie on the table $d$. Both the upper and lower cutters $e\ f$ are of spiral form, Figs. 1 to 4. Their cutting edges describe cylindrical figures the mathematical axes of which coincide with the axes of rotation. The upper cutter is firmly fixed in its roller $h$, which is covered with a layer $g$ of india-rubber or the like. This roller is driven in a suitable manner and engages with its gear-wheel $i$ in a corresponding gear-wheel $j$ of the lower roller $k$, which is consequently forced to move with the upper roller. A spring-controlled click $l$ is preferably arranged to prevent rotation in the wrong direction. The lower cutter $f$ is preferably not connected rigidly with its roller, but is yieldingly connected thereto, and is continuously pressed by a spring $m$ against the edge of the upper cutter $e$, so that a clean cut is insured each time. This device makes a cut which runs diagonally to the direction of feed and is nothing else than the development of the cutting edge along a plane. The steeper the pitch of the spiral cutter the less the cut will deviate from a line vertical to the direction of feed. If the cutting edge is allowed to coincide with the straight line generating the cylindrical surface, the band is cut vertical to the direction of feed, only there is not then the great advantage of the cut being effected gradually. Nevertheless, a gradual cut at right angles to the direction of feed can be produced. For this purpose one cutting edge is allowed to work in a radial plane, but so arranged that it is not at an equal distance from the axis of rotation at all points. The edge of the second cutter is then to be formed to correspond with that of the first, so that at all points their proper coöperation is insured. The edge of the first cutter may, for instance, be in the form of an arc, Figs. 5 and 7, which lies in one plane, the concave side of which is turned toward the axis of rotation. The corresponding second cutter, Figs. 6 and 8, is also bent to a similar curve, which, however, does not run in the radial plane. The cutters may also be made toothed. The cut will then not be a clean one, which, indeed, is not desirable for many purposes. The toothed cutters have the advantage of not becoming blunt so quickly.

Having now described my invention, what I claim, and desire to secure by Letters Patent, is—

1. In devices for cutting off pieces of belts, strips of paper, weaving, and the like, rotary cutters coöperating in pairs and both rotating around their axes, the axes of rotation being vertical to the direction of the feed and parallel to the plane of the belt, one of said knives being yielding, substantially as described.

2. In devices for cutting off pieces of belts or strips of paper, weaving or the like rotary cutters coöperating together in pairs, the axes of rotation being vertical to the direction of the feed and parallel to the plane of the belt, both cutters $e, f$ being of spiral form, the one of which $e$ is firmly fixed in its roller $h$ and the other $f$ is pressed by a spring $m$ against the edge of the cutter $e$, substantially as set forth and described.

In witness whereof I have hereunto set my hand in presence of two witnesses.

ERWIN HERMANN JAHNZ.

Witnesses:
WOLDEMAR HAUPT,
HENRY HASPER.